United States Patent [19]

Zimmermann

[11] 4,399,932

[45] Aug. 23, 1983

[54] VOLUMETRIC METERING VALVE

[76] Inventor: Guenter Zimmermann, 600 Casler, Clearwater, Fla. 33515

[21] Appl. No.: 269,462

[22] Filed: Jun. 2, 1981

[51] Int. Cl.³ .............................................. B67D 5/46
[52] U.S. Cl. ..................................... 222/380; 222/383
[58] Field of Search ................ 222/380, 383, 385, 452

[56] References Cited

U.S. PATENT DOCUMENTS

| 10,638 | 3/1854 | Larwill et al. | 222/452 |
| 134,880 | 1/1873 | Gee | 222/452 X |
| 1,327,990 | 1/1920 | French | 222/380 X |
| 4,234,107 | 11/1980 | Gernlein | 222/380 X |

FOREIGN PATENT DOCUMENTS 707692 5/1966 Italy ..................................... 222/383

*Primary Examiner*—David A. Scherbel
*Attorney, Agent, or Firm*—A. W. Fisher, III

[57] ABSTRACT

A double shoe volumetric metering valve comprising an elongated hollow substantially cylindrical valve housing having a feed port and a supply port formed in one end portion thereof and a discharge port formed in the opposite end portion thereof, a rotatable shaft having a first and second valve shoe operatively mounted thereon disposed within the elongated hollow substantially cylindrical valve housing, a valve shoe position control coupled to the rotatable shaft to selectively move the first and second valve shoes relative to the feed port and discharge port to selectively open and close the feed port and discharge port respectively wherein the first and second valve shoes are offset 90° relative to each other on the rotatable shaft and a volumetric feed control in operative communication with the feed port and supply port to selectively draw foodstuff or the like from a supply hopper through the feed port into the elongated hollow substantially cylindrical valve housing and discharge the food stuff from the remotely disposed discharge port.

7 Claims, 8 Drawing Figures

VOLUMETRIC METERING VALVE

BACKGROUND OF THE INVENTION

1. Field of the Invention

A volumetric metering valve for use in dispensing foodstuffs.

2. Description of the Prior Art

A common problem in volumetric dispensing of foodstuff and the like is that the dispensing device is often used alternately to fill with either hot or cold product. As a result of the different expansion and contraction of the core devices and the inside of the cylinders often permits either a clearance between the core and inside of the cylinder causing a flow therebetween and often permitting air to enter into the system to defeat the filling process. Alternately the inside of the cylinder and outer surface of the core often impinge on each other preventing the proper movement therebetween.

Moreover, quite often due to the problem of floor space with the device itself, there is a problem with locating the hopper or reservoir to retain the bulk foodstuff and displacing it horizontally from the filling station. As a solution, the reservoir must be directly over the discharge nozzle to provide the compression and vacuum drawn from the reservoir hopper. While the discharge orifice is displaced remotely from the pump drive or piston mechanism as well as the hopper itself which is generally displaced. The seating between shoe and the interior surface of the tube or housing is maintained by the bias means or O-ring disposed between the flat portion of the shoe and the rotating shaft.

SUMMARY OF THE INVENTION

The present invention relates to a double shoe volumetric metering valve comprising an elongated hollow valve housing having a rotatable shaft disposed therein in combination with a valve shoe position control and volumetric feed control.

The elongated hollow valve housing includes a feed port in open communication with a supply hopper and supply port in open communication with the volumetric feed control.

A first and second convex or arcuate valve shoe offset 90° relative to each other are attached to the rotatable shaft.

The volumetric feed control may comprise a volumetric supply reservoir such as a piston and cylinder structure. The piston may be coupled to a cam to provide a predetermined volumetric void with the cylinder. The valve shoe position control comprises a coupling means operatively interconnected to the drive means to selectively open and close the feed port and discharge port as more fully described hereinafter.

The volumetric feed control includes a suction or feed phase and a positive or discharge phase which may be either mechanically or electrically timed with the valve shoe position control to provide the sequence of operation. Initially the feed port is open while the discharge port is closed by the first and second convex or arcuate valve shoes. As the piston moves downward within the cylinder under the influence of the cam and interconnecting linkage, foodstuffs or the like are drawn from the supply hopper through the feed and supply ports into the volumetric supply reservoir. As the piston reaches it lower point of travel the actuator means or air cylinder is actuated by the drive means rotating the rotatable shaft 90° closing the feed port while opening the discharge port. The piston under the influence of the cam and interconnecting linkage is then moved upward within the cylinder forcing the foodstuff or the like from the volumetric supply reservoir through the elongated hollow valve housing and out discharge port. The actuator means then reverses the rotation of the rotatable shaft causing the first and second convex or arcuate valve shoes to again open and close the feed and supply ports to continue the cycle of operation.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figures 1, 2, 3, 4:
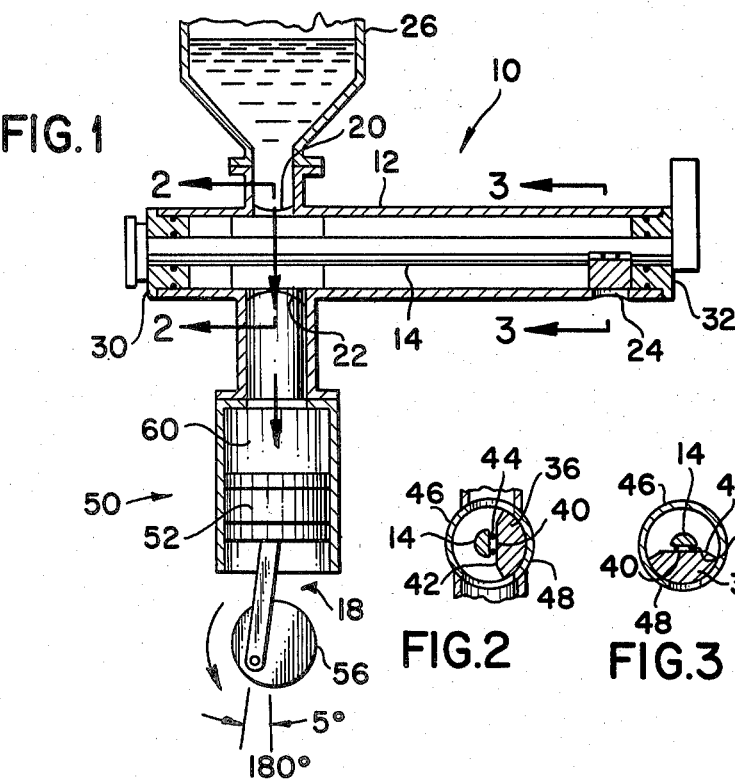
FIG. 1 is a side view of the double shoe valve metering in the intake or feed mode.
FIG. 2 is a cross-sectional side view of a first convex or arcuate valve shoe taken along line 2—2 of FIG. 1.
FIG. 3 is a cross-sectional side view of a second convex or arcuate valve shoe taken along line 3—3 of FIG. 1.
FIG. 4 is an end view of a valve shoe position control.
Figures 5, 6, 7, 8:
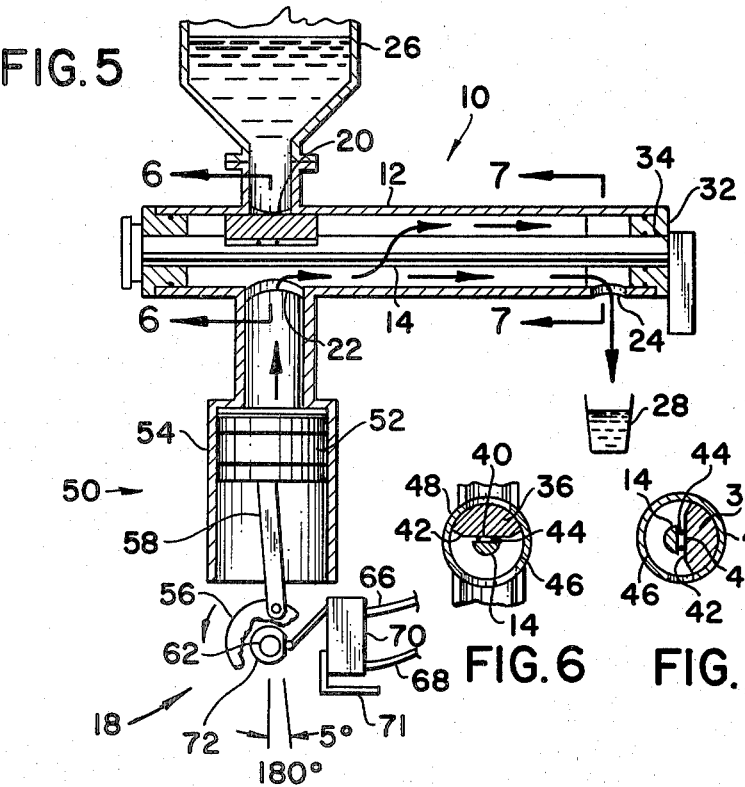
FIG. 5 is a side view of the double shoe valving meter in the discharge mode.
FIG. 6 is a cross-sectional side view of a first convex or arcuate valve shoe taken along line 6—6 of FIG. 5.
FIG. 7 is a cross-sectional side view of a second convex or arcuate valve shoe taken along line 7—7 of FIG. 5.
FIG. 8 is an end view of a valve shoe position control.

As best shown in FIGS. 1 and 5 the present invention relates to a double shoe volumetric metering valve generally indicated as 10. As shown therein, the metering valve 10 comprises an elongated hollow substantially cylindrical valve housing 12 having a rotatable shaft 14 disposed therein in combination with a valve shoe position control and volumetric feed control generally indicated as 16 and 18 respectively.

As best shown in FIGS. 1 and 5, the elongated hollow substantially cylindrical valve housing 12 includes a feed port and supply port 20 and 22 respectively formed in one end portion thereof and a discharge port 24 formed in the opposite end portion thereof. The feed port 20 is in open communication with a supply hopper 26 while the supply port 22 is in open communication with the volumetric feed control 18 as more fully described hereinafter. The feed port 20 and supply port 22 are disposed on opposite sides of the elongated hollow substantially cylindrical valve housing 12 displaced substantially 180° degrees relative to each other while the remotely disposed discharge port 24 is coaxially aligned with the supply port 22 to selectively discharge food stuffs or the like into a cup or container 28. A pair of end caps 30 and 32 are removably disposed in opposite ends of the elongated hollow substantially cylindrical valve housing 12 wherein the end cap 32 includes an aperture 34 to receive a portion of the valve shoe position control 16 as more fully described hereinafter.

As best shown in FIGS. 2, 4, 6, and 7 a first and second convex or arcuate valve shoe 36 and 38 respectively are affixedly attached to the rotatable shaft 14. As shown therein the first and second convex or arcuate valve shoes 36 and 38 are offset 90° relative to each other on the rotatable shaft 14. Both the first and second convex or arcuate valve shoes 36 and 38 are fixedly coupled to the rotatable shaft 14 by means of a connecting pin 40 disposed between the flat or inner surfaces 42 of the first and second convex or arcuate valve shoes 36 and 38 by a bias means or o-ring 44 which permits the first and second convex or arcuate valve shoes 36 and 38 to move longitudinally relative to the central axis of the connecting pins 40 under the influence of the inner surface 46 of the elongated hollow substantially cylindrical valve housing 12 to provide a self-adjusting feature to insure and enhance the sealing between the convex or arcuate outer portion 48 of the first and second convex or arcuate valve shoes 36 and 38 and the inner surface 46.

As best shown in FIGS. 1 and 5, the volumetric feed control 18 may comprise a volumetric supply reservoir 50 such as a piston and cylinder structure generally indicate as 52 and 54 respectively. The piston 52 may be coupled to a cam 56 by interconnecting linkage 58 to provide a predetermined volumetric void chamber 60. The cam 56 or volumetric feed control drive is coupled to a drive means by shaft 62 to operatively move the piston 52 relative to the cylinder 54 to selectively draw foodstuff or the like from the supply hopper 26 through the feed port 20, elongated hollow substantially cylindrical valve housing 12 and supply port 22 into the volumetric void 60 as more fully described hereinafter. As best shown in FIGS. 4 and 8, the valve shoe position control 16 is operatively interconnected to the drive means to selectively open and close the feed port 20 and discharge port 22 as more fully described hereinafter.

As shown in FIGS. 1 and 5, the volmetric feed control 18 includes a suction or feed phase and a positive or discharge phase which may be either mechanically or electrically timed with the valve shoe position control 16 to provide the sequence of operation. Initially the feed port 20 is open while the discharge port 24 is closed by the first and second convex or arcuate valve shoes 36 and 38 respectively. As the piston 52 moves downward within the cylinder 54 under the influence of the cam 56 and interconnecting linkage 58, foodstuffs or the like are drawn from the supply hopper 26 through the feed and supply ports 20 and 22 respectively into the volumetric supply reservoir 50. As the piston 52 reaches its lower point of travel indicated as 180° an actuator means comprising an air cylinder 64 is actuated by air hoses 66 and 68 controlled by switch 70, bracket 71 and cam 72 mounted on shaft 62 to rotate the rotatable shaft 14 through linkage 74 and lever 76, 90° closing the feed port 20 while opening the discharge port 24. The piston 52 under the influence of the cam 56 and interconnecting linkage 58 is then moved upward within the cylinder 54 forcing the foodstuff or the like from the volumetric supply reservoir 50 through the elongated hollow substantially cylindrical valve housing 12 and out discharge port 24 into the container 28 (as shown from 180° to 360°). The actuator means then reverses the rotation of the rotatable shaft 14 causing the first and second convex or arcuate valve shoes 36 and 38 to again open and close the feed and supply ports 20 and 22 respectively to continue the cycle of operation. As shown the volumetric feed control 18. 16 is actuated approximately 5° either side of top dead center or bottom dead center to provide the cycling operation.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described,
What is claimed is:

1. A double shoe volumetric metering valve comprising an elongated hollow valve housing having a feed port and a supply port formed in one end portion thereof and a discharge port formed in the opposite end portion thereof, a rotatable shaft having a first and second valve shoe operatively mounted thereon disposed within the elongated hollow valve housing, a valve shoe position control coupled to the rotatable shaft to selectively move said first and second valve shoes relative to said feed port and discharge port to selectively open and close said feed port and discharge port respectively wherein said first and second valve shoes are offset relative to each other on said rotatable shaft and a volumetric feed control in operative communication with said feed port and supply port to selectively draw foodstuff or the like from a supply hopper through said feed port into said elongated hollow valve housing and discharge the food stuff from said remotely disposed discharged port.

2. The double shoe volumetric metering valve of claim 1 wherein said feed port and said supply port are disposed 180° relative to each other on said elongated hollow valve housing.

3. The double shoe volumetric metering valve of claim 2 wherein said discharge port aligned longitudinally with said supply port on said elongated hollow valve housing.

4. The double shoe volumetric metering valve of claim 3 wherein said first and second valve shoes are offset 90° relative to each other.

5. The double shoe volumetric metering valve of claim 1 wherein said first and second valve shoe each comprising a convex valve body fixedly attached to said rotatable shaft.

6. The double shoe volumetric metering valve of claim 5 wherein said first and second convex valve shoes each include an inner flat surface connected to said rotatable shaft by a connecting pin.

7. The double shoe volumetric metering valve of claim 6 wherein each said first and second valve shoe includes a bias means disposed between said inner flat surface and said rotatable shaft to permit longitudinal movement relative to the central axis of said connecting pin under the influence of the inner surface of said elongated hollow valve housing.

* * * * *